US008437361B2

(12) United States Patent
Guo et al.

(10) Patent No.: US 8,437,361 B2
(45) Date of Patent: May 7, 2013

(54) ADAPTIVE SUBCHANNEL DISABLING IN BEAMFORMED WIRELESS COMMUNICATION SYSTEMS

(75) Inventors: Li Guo, Irving, TX (US); Hanqing Lou, Garland, TX (US); Weiguo Xie, Plano, TX (US); Lin Zeng, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 976 days.

(21) Appl. No.: 12/405,442

(22) Filed: Mar. 17, 2009

(65) Prior Publication Data

US 2010/0238797 A1 Sep. 23, 2010

(51) Int. Cl.
*H04J 3/17* (2006.01)
(52) U.S. Cl.
USPC ............ 370/433; 370/336; 370/468; 370/328
(58) Field of Classification Search .................. 370/437, 370/318, 328, 252, 468, 336
See application file for complete search history.

(56) References Cited

U.S. PATENT DOCUMENTS

| | | | | |
|---|---|---|---|---|
| 6,246,881 B1 * | 6/2001 | Parantainen et al. | ......... | 455/450 |
| 7,209,712 B2 * | 4/2007 | Holtzman | ................. | 455/67.13 |
| 7,403,748 B1 * | 7/2008 | Keskitalo et al. | ............ | 455/101 |
| 7,450,545 B2 * | 11/2008 | Kim et al. | ..................... | 370/331 |
| 7,627,347 B2 * | 12/2009 | Codreanu et al. | .......... | 455/562.1 |
| 7,672,381 B1 * | 3/2010 | Kleider et al. | ................ | 375/260 |
| 7,855,948 B2 * | 12/2010 | Anikhindi et al. | ............ | 370/208 |
| 8,059,744 B2 * | 11/2011 | Jin et al. | ........................ | 375/267 |
| 8,194,623 B2 * | 6/2012 | Chong et al. | .................. | 370/336 |
| 2004/0085939 A1 * | 5/2004 | Wallace et al. | ............... | 370/335 |
| 2005/0078763 A1 * | 4/2005 | Choi et al. | ..................... | 375/267 |
| 2005/0277444 A1 * | 12/2005 | Rensburg et al. | .......... | 455/562.1 |
| 2008/0076438 A1 * | 3/2008 | Chang et al. | ............... | 455/452.2 |
| 2008/0132173 A1 * | 6/2008 | Sung et al. | .................. | 455/67.13 |
| 2009/0015472 A1 * | 1/2009 | Lozano | .......................... | 342/367 |
| 2009/0190537 A1 * | 7/2009 | Hwang et al. | ................. | 370/329 |

OTHER PUBLICATIONS

Sadek et al.;"Active Antenna Selection Multiuser MIMO Communication"; 2007; IEEE; pp. 1-13.*

* cited by examiner

*Primary Examiner* — Ricky Ngo
*Assistant Examiner* — Dewanda Samuel
(74) *Attorney, Agent, or Firm* — Edell, Shapiro & Finnan, LLC (57) ABSTRACT

Techniques are provided herein to adaptively and independently disable use of subchannels in transmission sent from a first wireless communication device to a second wireless communication device. The first wireless communication device receives transmission sent to it by the second wireless communication device. The transmissions occupy some or all of a plurality of subchannels within a frequency band that are available for use in the transmission. The transmissions received at the first wireless communication device are evaluated in each subchannel for an over-the-air wireless link between the first wireless communication device and the second wireless communication device. Based on the evaluation, zero or more of the plurality of subchannels are independently disabled in transmissions that are sent by the first wireless communication device to the second wireless communication device.

24 Claims, 8 Drawing Sheets

ADAPTIVE SUBCHANNEL DISABLING IN BEAMFORMED WIRELESS COMMUNICATION SYSTEMS

TECHNICAL FIELD

The present disclosure relates to wireless communication devices and systems and more particularly to adaptively disabling one or more subchannels of a transmission from a first wireless communication device to a second wireless communication device.

BACKGROUND

In some wireless communication systems, the frequency bandwidth of a transmission from a first wireless communication device to a second wireless communication device is divided into several subchannels. For example, in a WiMAX™ wireless communication system, in the adaptive modulation and code (AMC) mode, there are multiple subchannels in a transmission frame and each subchannel comprises a plurality of subcarriers. More specifically, there are 24 subchannels in the WiMAX AMC mode, and the bandwidth of one subchannel comprises 18 subcarriers that span approximately 200 kHz. In the AMC mode, a downlink (DL) transmission from a base station to a mobile station or an uplink (UL) transmission from a mobile station to the base station occupies one or more of these subchannels.

The wireless link between two wireless communication devices can be time-varying. Consequently, the link quality in each subchannel may change over time. The link quality can be so bad at certain times that the subchannel can not be used to reliable carry a message even with maximum transmit power and a low data rate. At these times, it is better practice not to allocate data (energy) to that subchannel by effectively "disabling" the subchannel for a period of time.

In some wireless communication systems, such as a WiMAX system, the channel bandwidth is generally larger than the so-called coherent bandwidth. As a result, the correlation between different subchannels may be low. Therefore, the subchannels may vary differently over time and also independently experience different types of link quality variations.

In a TDD WiMAX system, the beamforming weight vector that the base station uses for each DL subchannel to a particular mobile station is estimated from a transmission that the base station receives from the particular mobile station on the corresponding UL subchannel. Therefore, when one UL subchannel is disabled, extra effort is needed at the base station to compute beamforming weights for the corresponding DL subchannel.

Accordingly, when applying a channel disable scheme to a wireless channel that behaves in this way, it is desirable to apply a disable scheme on each subchannel separately and independently. Moreover, a mechanism is needed to compute beamforming weights used by the base station for a DL transmission to a particular mobile station when one or more subchannels in an UL transmission from the particular mobile station are disabled.

DESCRIPTION OF EXAMPLE EMBODIMENTS

Overview

Techniques are provided herein to adaptively and independently disable use of subchannels in transmission sent from a first wireless communication device to a second wireless communication device. The first wireless communication device receives transmission sent to it by the second wireless communication device. The transmissions occupy some or all of a plurality of subchannels within a frequency band that are available for use in the transmission. The transmissions received at the first wireless communication device are evaluated in each subchannel for an over-the-air wireless link between the first wireless communication device and the second wireless communication device. Based on the evaluation, zero or more of the plurality of subchannels are independently disabled in transmissions that are sent by the first wireless communication device to the second wireless communication device.

Figure 1:
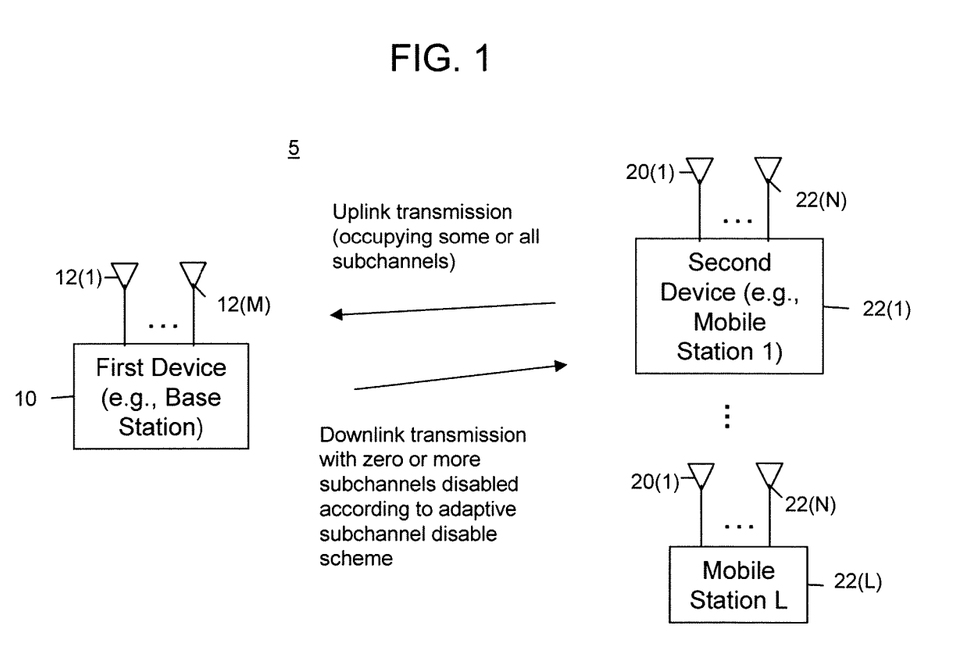
FIG. 1 is a block diagram of a wireless communication system in which a first wireless communication device on a wireless communication link is configured to adaptively disable subchannels in transmissions it sends to a second wireless communication device.

Referring first to FIG. 1, a wireless communication system is shown generally at reference numeral 5, and comprises a first wireless communication device, e.g., a base station (BS) 10 and a plurality of second wireless communication devices, e.g., mobile stations (MSs) 20(1)-20(L). The BS 10 comprises at least one antenna, but in more practical cases, it comprises a plurality of antennas 12(1)-12(M), and each MS 20(1)-20(L) comprises at least one, and in some cases, a plurality of antennas 22(1)-22(N). The BS 10 may connect to other wired data network facilities (not shown) and in that sense serves as a gateway or access point through which the MSs 20(1)-20(L) have access to those data network facilities.

The BS 10 may wirelessly communicate with individual ones of the MSs 20(1)-20(N) using a wideband wireless communication protocol. An example of such a wireless communication protocol is the IEEE 802.16 communication standard, also known commercially as WiMAX™.

As explained above, in some wireless communication systems, the frequency bandwidth of a transmission sent from one wireless communication device to another wireless communication device is divided into several subchannels. For example, in a WiMAX wireless communication system, the adaptive modulation and code (AMC) permutation, there are multiple subchannels in a transmission and each subchannel comprises a plurality of subcarriers. More specifically, there are 24 subchannels in the WiMAX AMC permutation, and the bandwidth of one subchannel is approximately 200 kHz and comprises 18 subcarriers. In the AMC permutation, a downlink (DL) transmission from the BS 10 to one of the MSs 20(1)-20(L) or an uplink (UL) transmission from one of the MS 20(1)-20(L) to the BS 10 occupies some or all of these subchannels.

According to the techniques described herein, transmissions are received at a wireless communication device that were sent by another wireless communication device, wherein the transmission occupy some or all of a plurality of subchannels within a frequency band that are available for use in the transmission. The received transmissions are evaluated for an over-the-air wireless link with respect to the other wireless communication device. Based on the evaluation, zero or more of the plurality of subchannels are independently disabled in transmissions that are sent to the other wireless communication device.

The techniques described herein may be employed when the BS 10 transmits in DL transmissions to a particular one of the plurality of MSs 20(1)-20(L) based on UL transmissions the BS 10 receives from the particular MS, or they may be employed by any one or more of the MSs 20(1)-20(L) when it/they transmit UL transmissions to the BS 10 based on received DL transmission from the BS 10.

Figure 2:
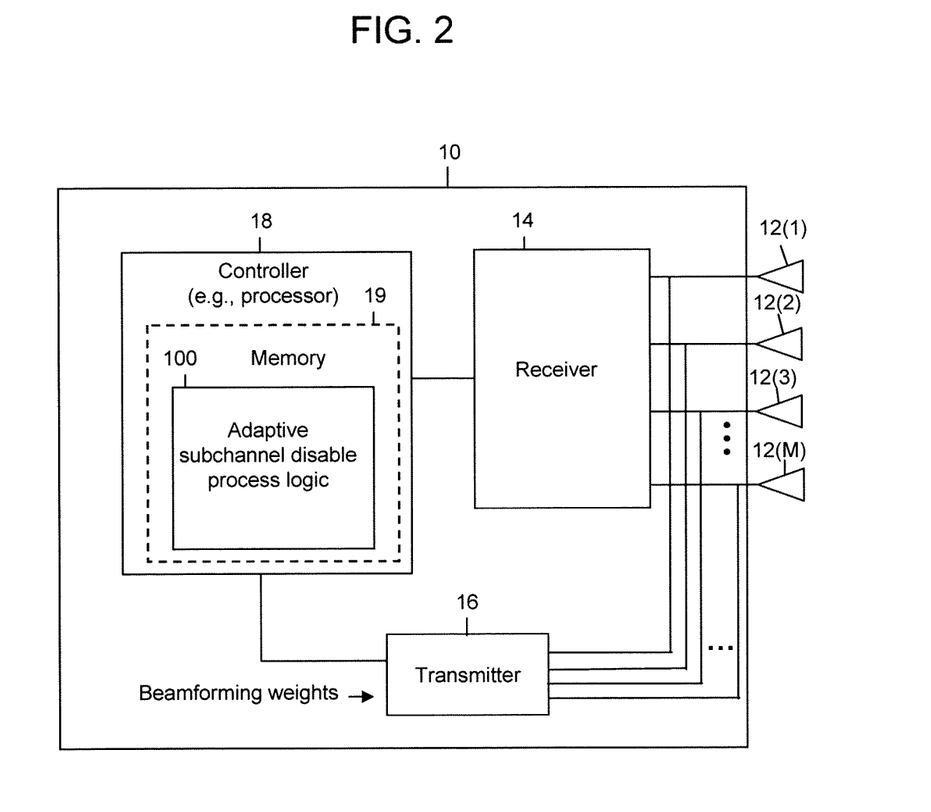
FIG. 2 is a block diagram of a wireless communication device configured to adaptively disable subchannels.

Reference is now made to FIG. 2 that shows an example of a block diagram of the first device 10 that is configured to perform an adaptive subchannel disable scheme. As shown in FIG. 2, the first device 10 comprises a radio receiver 14, a radio transmitter 16 and a controller 18. The controller 18 supplies data to the transmitter 16 to be transmitted and processes signals received by the receiver 14. In addition, the controller 18 performs other transmit and receive control functionality. Part of the functions of the receiver 14, transmitter 16 and controller 18 may be implemented in a modem and other parts of the receiver 14 and transmitter 16 may be implemented in radio transmitter and radio transceiver circuits. It should be understood that there are analog-to-digital converters (ADCs) and digital-to-analog converters (DACs) in the various signal paths to convert between analog and digital signals.

The receiver 14 may comprise a plurality of individual receiver circuits, each for a corresponding one of a plurality of antennas 12(1)-12(M) and which outputs a receive signal associated with a signal detected by a respective one of the plurality of antennas 12(1)-12(M). For simplicity, these individual receiver circuits are not shown. The receiver 14 receives the signals detected by each of the antennas 12(1)-12(M) and supplies corresponding antenna-specific receive signals to controller 16. Likewise, the transmitter 16 may comprise individual transmitter circuits that supply respective upconverted signals to corresponding ones of a plurality of antennas 12(1)-12(M) for transmission. For simplicity, these individual transmitter circuits are not shown.

The controller 18 comprises a memory 19 or other data storage block that stores data used for the techniques described herein. The memory 19 may be separate or part of the controller 18. In addition, instructions for adaptive subchannel disable process logic 100 may be stored in the memory 19 for execution by the controller 18. The transmitter 16 is configured to generate a transmit signal based on commands it receives from the controller 18 (with zero or more subchannels disabled in a given transmission according to the subchannel disable scheme described hereinafter). The controller 18 may be further configured to generate beamforming weights based on information produced by the adaptive subchannel disable process logic 100. The controller 18 supplies the beamforming weights to the transmitter 16 and the transmitter 16 applies the beamforming weights to a signal to be transmitted to produce a plurality of weighted antenna-specific transmit signals that are transmitted by corresponding ones of the plurality of antennas 12(1)-12(M).

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein (and/or to store software or processor instructions that are executed to carry out the computations described herein). Thus, the process 100 may be implemented with fixed logic or programmable logic (e.g., software/computer instructions executed by a processor) and the controller 18 may be a programmable processor, programmable digital logic (e.g., field programmable gate array) or an application specific integrated circuit (ASIC) that comprises fixed digital logic, or a combination thereof.

Any of the MSs 20(1)-20(L) may be configured in a manner similar to that shown in FIG. 2, and in this regard, also perform the adaptive subchannel disabling techniques described herein. For simplicity and example purposes only, the adaptive subchannel disable process logic 100 is described as being performed in the BS 10 with respect to communications that BS 10 has with any given one of the plurality of MSs 20(1)-20(L). Moreover, the BS 10 is configured to perform the adaptive subchannel disable techniques separately for each of the plurality of MSs 20(1)-20(L).

Figure 3:
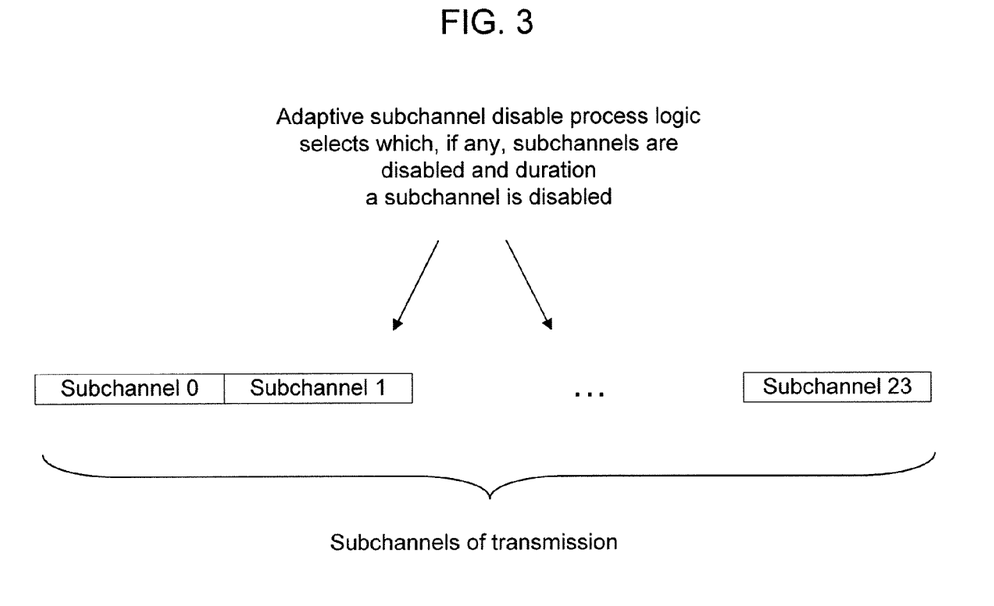
FIG. 3 is a diagram depicting a transmission comprised of a plurality of subchannels, zero or more of which may be adaptively and independently disabled.

Reference is now made to FIG. 3. The adaptive subchannel disable process logic 100 updates disable scheme parameters by adapting to changing conditions on the wireless link between the BS 10 and any given MS. As explained above, there are 24 subchannels in the WiMAX AMC mode. The bandwidth of each subchannel is approximately 200 kHz and comprises 18 subcarriers. In the AMC mode, a DL transmission from the BS 10 to one of the MSs 20(1)-20(L) or UL transmission from one of the MS 20(1)-20(L) to the BS 10 occupies some or all of these subchannels. The adaptive subchannel disable process logic 100 selects, which, if any subchannels are disabled in a DL transmission and also determines a time duration that a subchannel is disabled (e.g., for how many transmission frames a subchannel is disabled). In addition, beamforming weight calculation for individual subchannels is changed adaptively based on the disable status of each DL/UL subchannel.

The term "transmission" as used herein refers to a formatted signal that is transmitted from one device to another, and is meant to include what is known as a frame that comprises a frame may comprise several fields, including a preamble field and a data or traffic field. Generally, a device sends a burst comprising numerous frames, depending on the amount of data to be transmitted.

Through self-learning, the adaptive subchannel disable process logic 100 updates channel statistic information for each subchannel and adjusts whether a subchannel is disabled as well as the disable time duration if a subchannel is to be disabled. By continuously monitoring conditions of the wireless link within each individual subchannel, the disable scheme parameters can be adjusted to adapt to time-varying conditions of wireless link. A wireless link determined to have "low-velocity" variations changes very slowly while a wireless link with "high-velocity" variations changes quickly. Furthermore, the wireless environment for an MS may change due to its movement from one location to another (e.g., moving from an area with minimal multipath to an area with substantial multipath), or an MS may be subject to frequent or constant motion. The adaptive subchannel disable process logic 100 provides the capability to update the channel disable scheme in order to adapt to changing conditions in a wireless link between two wireless communication devices, and to independently control allocation to subchannels.

Figure 4:
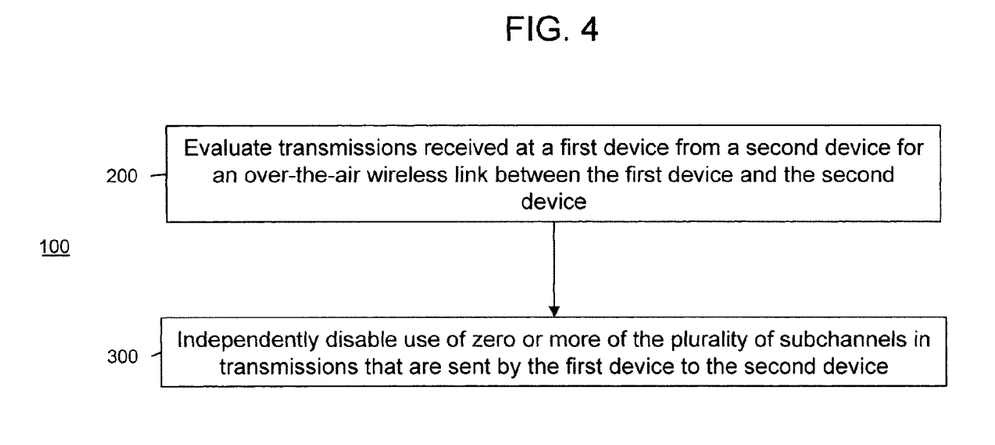
FIG. 4 is a flow chart that generally depicts an adaptive subchannel disable process.

Reference is now made to FIG. 4 for a general description of the adaptive subchannel disable process logic 100. Signal transmissions, e.g., frames, are received by a first wireless communication device, e.g., the BS 10, from a second wireless communication device, e.g., any one of the MSs 20(1)-20(L), wherein each transmission occupies some of all of the plurality of subchannels that are available for use. Furthermore, the subchannels occupied in any given transmission at one point in time may be different from the subchannels occupied by a transmission at some other point in time. Thus, the second wireless communication device may be employing subchannel disabling in a manner like process logic 100 or in some other manner. At 200, the transmissions received at the first device from the second device are evaluated for an over-the-air wireless link between the first device and the second device. At 300, based on the evaluation made at 200, zero or more of the plurality of subchannels are independently disabled in transmissions that are sent by the first device to the second device.

Figure 5:
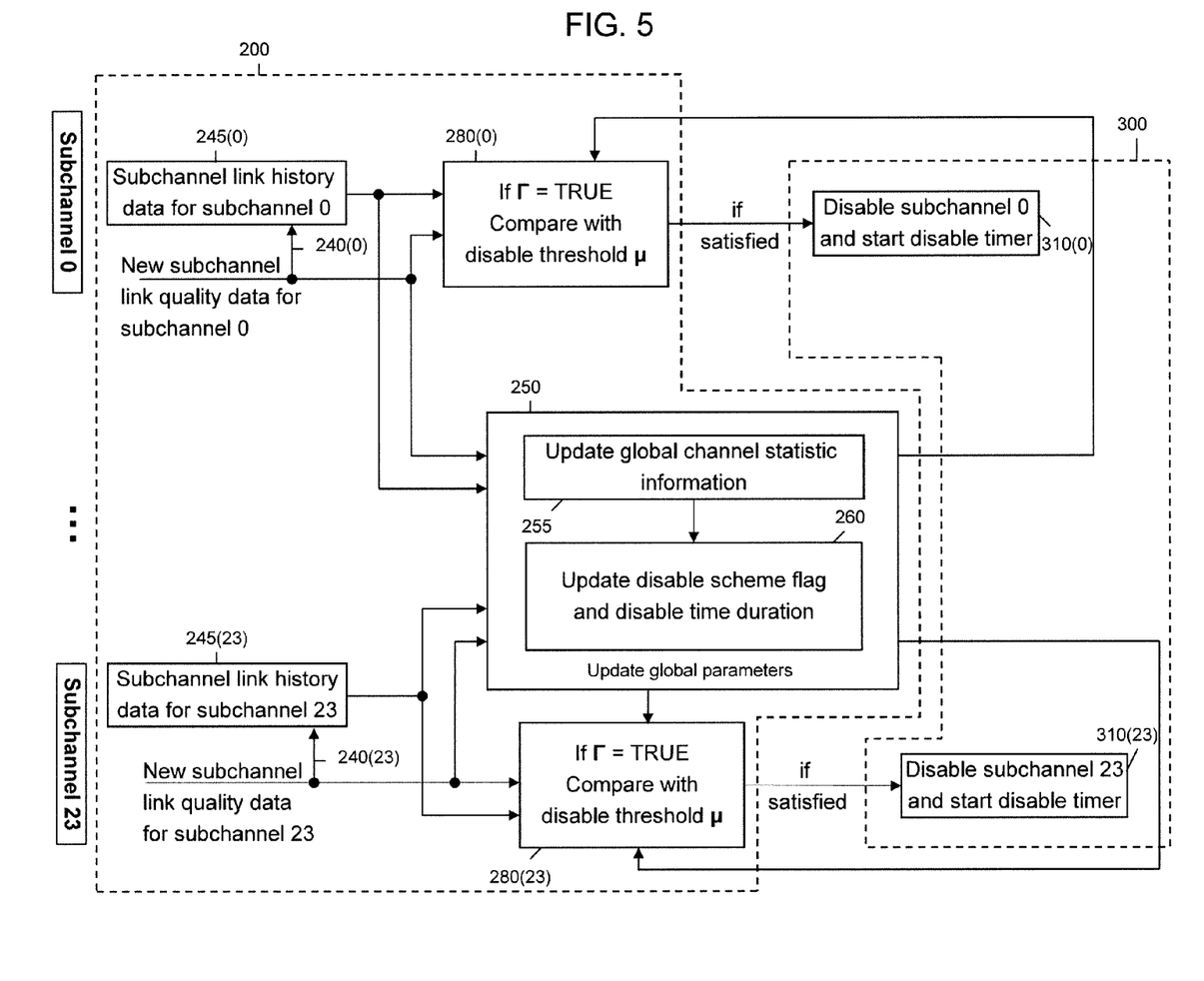
FIG. 5 is a flow chart that depicts the adaptive subchannel disable process performed across multiple subchannels.
Figure 6:
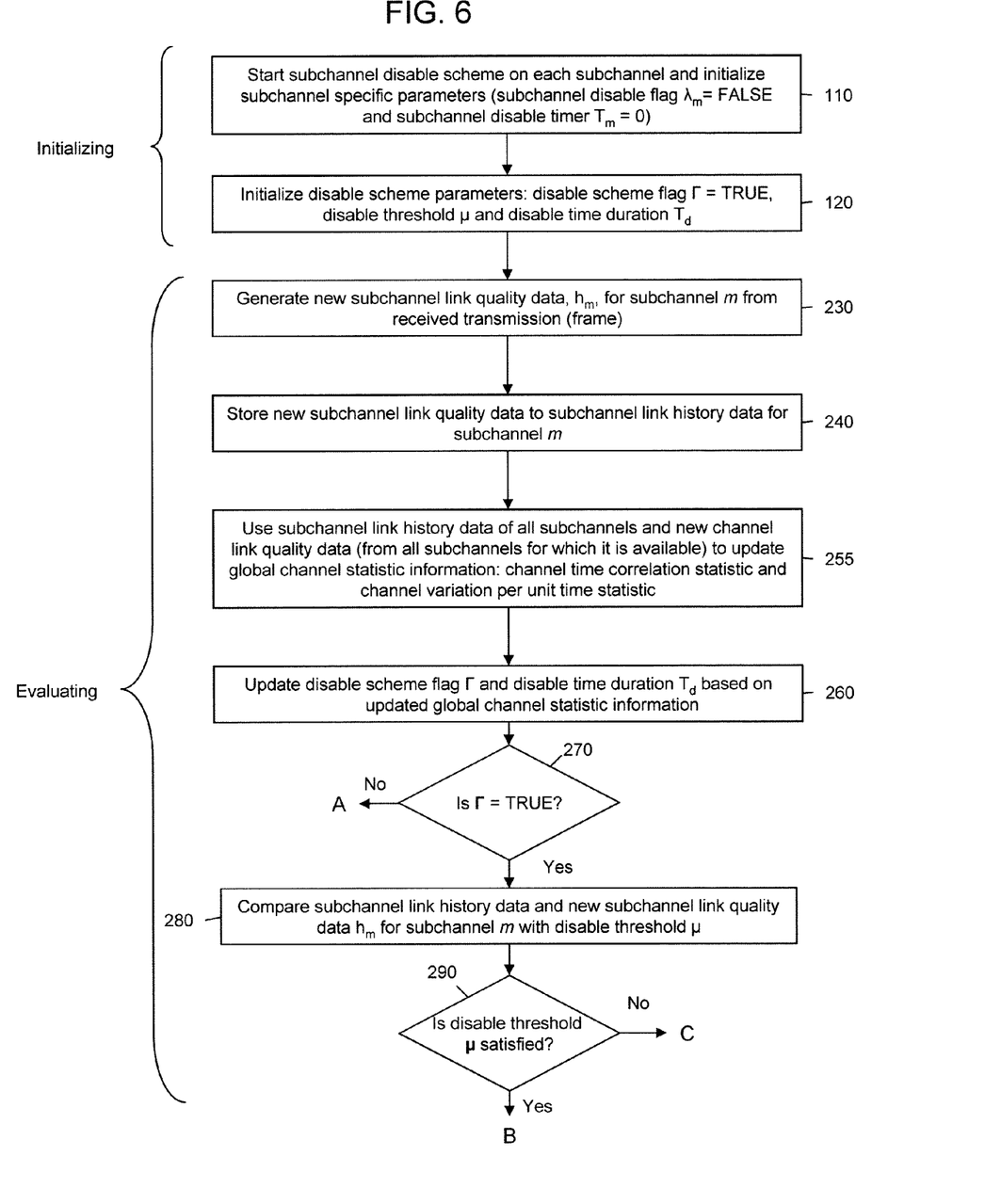
FIGS. 6 and 7 are flow charts depicting additional details of the adaptive subchannel disable process.
Figure 7:
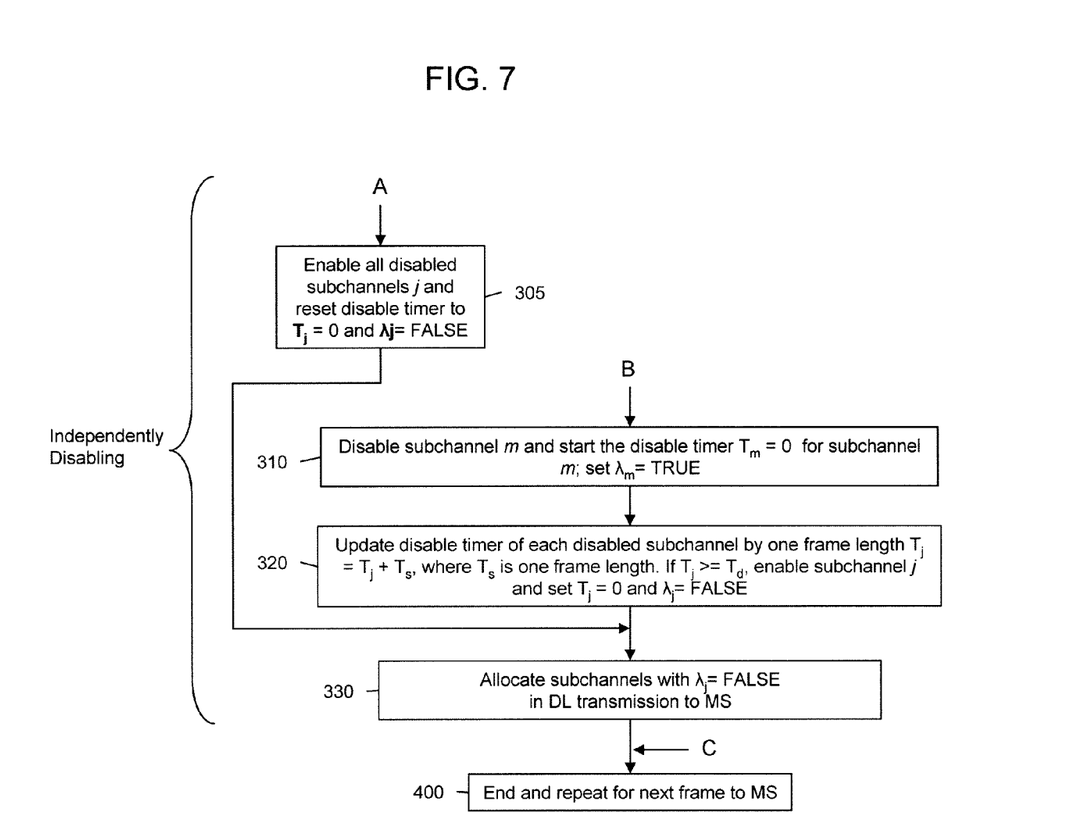

The functions performed at 200 and 300 of the process logic 100 are now described in greater detail with reference to FIGS. 5 and 6. FIG. 5 illustrates a view of the functions 200 from a system architecture point of view whereas FIGS. 6 and 7 illustrate the functions 200 and 300 in a more linear process point of view.

In the adaptive channel disable scheme, there are parameters maintained for each subchannel m, where m is used herein a subchannel index. Specifically, for each subchannel m there is a subchannel disable timer $T_m$, a subchannel disable flag $\lambda_m$ and subchannel link history data. Three parameters are also maintained for each MS 20(1)-20(L): a disable scheme flag $\Gamma$, a disable threshold $\mu$ and a disable time duration $T_d$. These three parameters are scheme parameters and apply generally to all the subchannels that the BS 10 may use when transmitting to a particular one of the plurality of MSs 20(1)-20(L). The disable threshold $\mu$ is determined based on system requirements through a priori analysis.

The disable scheme flag $\Gamma$ has two states, a first state, TRUE, and a second state, FALSE. If the disable scheme flag $\Gamma$=TRUE, the disable scheme is valid and is applied to a transmission that the BS 10 sends to that MS such that zero or more subchannels in a transmission from the BS 10 to that MS may be disabled. When $\Gamma$=FALSE, the disable scheme is turned off and the BS 10 will not adaptively disable zero or more subchannels in a transmission it sends to that MS. The subchannel link history data and new (most recent) subchannel link quality data for a subchannel are compared with the disable threshold $\mu$ for that MS to decide whether to disable a particular subchannel. The disable time duration $T_d$ comprises data that indicates the time duration that a subchannel should be disabled if a subchannel is to be disabled when transmitting to that MS.

As described in more detail hereinafter, whenever new subchannel link quality data is obtained for a given subchannel in a received transmission from an MC, two functions are performed. First, a determination is made as to whether to disable that subchannel when making an outbound transmission to that MS based on the new subchannel link quality data and updated subchannel link history data (having been updated by the new or most recent subchannel link quality data). Second, global channel statistic information is updated. Global channel statistic information comprises information developed from changes in link quality in all of the subchannels, hence the name "global". Thus, the global channel statistic information is updated any time there is an update to the subchannel link history data for any subchannel in connection with communication with a given MS. The global channel statistic information indicates how, e.g., rapidly or slowly, the wireless link between the two devices is changing over time. The disable scheme flag $\Gamma$ and disable time duration $T_d$ are updated based on the global channel statistic information.

Referring to FIG. 6, an initializing phase is first performed, where at 110, the subchannel disable scheme on each subchannel starts with initial parameters values for the subchannel disable timer $T_m$ and the subchannel disable flag $\lambda_m$. The subchannel disable flag $\lambda_m$ has two states, a first state (TRUE) and a second state (FALSE). The subchannel disable flag $\lambda_m$ is initially set to FALSE and the disable timer $T_m$ is initial set to zero (0). When a subchannel disable flag is set to TRUE, this means that the subchannel m is to be disabled and when is set to FALSE, the subchannel m is to be enabled. At 120, the disable scheme parameter are initialized for an MS (or all MSs) such that the disable scheme flag $\Gamma$ is set to TRUE, the disable threshold $\mu$ is set to predetermined value and the disable time duration $T_d$ is set to an initial value. These initial values may be determined through experimentation or through other techniques or knowledge gained from observations of system operations.

When a transmission is received at one or more antennas of the BS 10 from a given MS, new subchannel link quality data $h_m$ is generated for each subchannel. The subchannel link quality data $h_m$ may be derived from numerous components of a received transmission, such as the traffic/data, pilot subcarriers, broadcast information (if the transmission is a broadcast message) and feedback sent by the MS. For example, the subchannel link quality data $h_m$ may comprises received signal strength information (RSSI) for a given subchannel, carrier to interference plus noise (CINR) data produced by the BS 10 from the received transmissions, as well any other suitable link quality data that can be separated out as being associated with a particular subchannel of a transmission.

For example, one technique to generate subchannel link quality data $h_m$ is to compute a carrier-to-interference plus noise ratio (CINR) in each subchannel using received pilot or traffic signals in each subchannel. Numerous techniques are known in the art to compute CINR. For example, one such technique involves using log-likelihood ratio (LLR) data generated from a received transmission. The LLR data are collected as they are sent from a detector to the forward error correction (FEC) decoder in a wireless communications device. A CINR measurement is computed using the decoded bits output from the FEC decoder as feedback, or without feedback from the decoder.

The following is another example of a technique to compute CINR. For a sequence of symbols y1, ..., yn, the power of signal+noise is computed as $P1=((y1)^2+ \ldots +(yn)^2)/n$. Then, the noise power is computed as $Pn=((y2-y1)^2+(y3-y2)^2+ \ldots +(yn-yn-1)^2)/(2*(n-1))$. The CINR is then computed as CINR=abs(P1−Pn)/Pn.

The CINR is computed for each sub-channel using either of the techniques described above, or any other technique heretofore known of hereinafter developed.

When new subchannel link quality data $h_m$ is generated and available for subchannel m, then at 240 the new subchannel link quality data is stored to the subchannel link history data for that subchannel m. Examples of this are shown in FIG. 5 where at 240(1) new subchannel link quality data for subchannel 0 is stored to subchannel link history data 245(0) and similarly at 240(23) new subchannel link quality data for subchannel 23 is stored to subchannel link history data 245(23). FIG. 5 is meant by way of example only and it is to be understood that whenever new subchannel link quality data is generated for a given subchannel m, then its corresponding subchannel link history data is updated.

Still referring to FIG. 5, at 250, the subchannel link history data for all subchannels and new subchannel link quality data (from all subchannels for which it is available) are used to update the global parameters for subchannel disable scheme. That is, at 255, the global channel statistic information is updated. The global channel statistic information comprises, for example, a channel time correlation statistic and a channel variation per unit time statistic. Then at 260, the disable scheme flag $\Gamma$ and disable time duration $T_d$ are updated from the global channel statistic information. The channel time correlation statistic is a generalized measure of whether channel conditions of the wireless link (across any and all subchannels) between the BS 10 and a given MS is changing with time. The channel variation per unit time statistic is a more specific statistic that indicates how fast the channel conditions of the wireless link are changing for a given unit of time.

For example, one technique to compute the channel time correlation statistic is as follows. Suppose a sequence of subchannel link quality data is obtained from n CINR values for a given subchannel over time, e.g., $h_1, h_2, \ldots, h_n$. The channel time correlation statistic may be estimated as $h_1*\text{conj}(h_2)/\text{abs}(h_1)/\text{abs}(h_2) + h_2*\text{conj}(h_3)/\text{abs}(h_2)/\text{abs}(h_3) + h_{n-1}*\text{conj}(h_n)/\text{abs}(h_{n-1})/\text{abs}(h_n)$, and dividing this value by n−1 results in the channel time correlation statistic. Other methods now known or hereinafter developed may be used to compute the channel time correlation statistic.

A procedure for updating the disable time duration $T_d$ based on the global channel statistic information is now described. When the channel time correlation statistic is larger or the channel variation per unit time statistic is getting smaller, this indicates that the wireless link is not changing much over time and consequently the disable time duration $T_d$ may be increased by a predetermined amount—any subchannels that had been disabled can be continued to be disabled because channel information for the wireless link continues to be reliable since the wireless link is not changing rapidly, or is otherwise changing in a relatively slow and manageable manner. Conversely, when the channel time correlation statistic is getting smaller or the time variation per unit time is getting larger, this indicates that the channel is changing relatively fast and consequently the disable time duration $T_d$ is decreased by a predetermined amount—any subchannels that had been disabled should perhaps not continued to be disabled for much longer because the channel information is likely not reliable the wireless link is changing so quickly.

Another technique to adjust the disable time duration $T_d$ is to use a function: $T_d = \alpha T_s/p$, where $T_d$ is the disable time duration, $T_s$ is a frame length or time duration, p is the updated channel correlation statistic and $\alpha$ is a constant value.

A procedure for updating the disable scheme flag $\Gamma$ based on the global channel statistic information is as follows. When the channel correlation statistic is less than a first predetermined (time-variation) threshold, then the disable scheme flag is set to FALSE to stop the channel disable scheme. This situation occurs when the channel is changing so fast that it would be nearly impossible to adapt to it and consequently, the advantage of using the subchannel disable scheme would be lost. Therefore, the disable scheme is turned off by setting the disable scheme flag $\Gamma$ to FALSE. Conversely, when the channel disable scheme has been in a stopped or off state ($\Gamma$=FALSE) and the channel correlation statistic is greater than the first predetermined (time-variation) threshold, or a second predetermined threshold, then disable scheme flag $\Gamma$ is set to TRUE to enable the disable scheme. The first predetermined time-variation (and second predetermined threshold, if a two threshold technique is used) is set such that when the channel correlation statistic is greater than some level such that adapting to changes is possible or manageable, the subchannel disable scheme is turned on (and otherwise kept on). Said another way, the disable scheme flag is set to a first state during which zero or more subchannels in outbound transmissions (e.g., from a first wireless communication device to a second wireless communication device) are disabled when the global channel statistic information is less than a threshold indicative of the wireless link between the first and second wireless communication devices changing in a manageable manner. Conversely, the disable scheme flag is set to a second state during which zero or more subchannels in outbound transmissions are not disabled because the wireless link is changing too quickly.

After the disable scheme flag $\Gamma$ is updated and disable time duration $T_d$ is updated, the process continues to 270. At 270, it is determined whether the disable scheme flag is TRUE (the disable scheme is enabled). When the disable scheme flag is FALSE, then the process proceeds to 305 (FIG. 7) where each previously disabled subchannel j is enabled, its disable timer $T_j$ is set to zero its disable flag $\lambda_j$ is set to FALSE. On the other hand, when it is determined at 270 that the disable scheme flag $\Gamma$ is TRUE, then the process continues to 280.

At 280, for each subchannel m, at least one of the subchannel link history data and new subchannel link quality data $h_m$ is compared with the disable threshold $\mu$. For example, both the subchannel link history data and the new subchannel link quality data $h_m$ are compared to the disable threshold. The subchannel link history data may be implemented as a buffer that contains numerous entries of subchannel link quality data obtained for a given subchannel during prior update iterations. Thus, one technique for the comparison at 280 is to compare all of the buffered subchannel link history data and the new subchannel link quality data $h_m$ with the disable threshold, and if a certain number of subchannel link quality data (between the history data and the current or new subchannel link quality data $h_m$) is less than the threshold, the threshold conditions is determined to be satisfied. At 290, when the disable threshold condition is determined to be satisfied, then the process continues to 310, otherwise, the process continues to 400. FIG. 5 shows that the comparison with the disable threshold is made at 280(0) for subchannel 0 and similarly at 280(23) for subchannel 23. All subchannels are evaluated at 280 and 290 before proceeding to 310 or 400.

When the comparison with the disable threshold is satisfied at 290, then the independent disabling of subchannels begins in earnest and reference is now made to FIG. 7. At 310, for a subchannel that satisfies the disable threshold, its disable timer $T_m$ is started from zero and its disable flag $\lambda_m$ is set to TRUE thereby disabling that subchannel. This is also shown in FIG. 5 at 310(0) for subchannel 0 and at 310(23) for subchannel 23.

Next, at 320, the subchannel disable timer for each disabled subchannel j is updated by one frame length (time duration of one frame), that is $T_j = T_j + T_s$, where $T_s$ is the time duration of one frame. In addition, the updated value of the disable timer $T_j$ for a disabled subchannel j is compared with the disable time duration $T_d$, and if $T_j$ is greater than or equal to the disable time duration $T_d$, then any further disabling of that subchannel is terminated (it is enabled) and the disable timer $T_j$ for that subchannel j is set to 0 and its disable flag $\lambda_m$ is set to FALSE.

At 330, subchannels whose disable flags ($\lambda_j$) are set to FALSE for DL transmission from the BS 10 to a given MS are allocated (occupied with energy) and the DL transmission is made from the BS 10 to that MS. Thus, all other subchannels whose disable flag is set to TRUE are disabled and energy (data) is not allocated to those subchannels in a DL transmission. The function 330 is thus reached either from function 320 or from function 305, where function 305 occurs when the disable scheme flag Γ is FALSE.

At 400, the process ends and is repeated for the next frame to a given MS. The process depicted in FIGS. 5-7 is conducted separately and independently by the BS 10 with respect to each MS with which the BS 10 communicates. At any given time and for each MS, the BS 10 keeps track of a separate and independent (and possibly different) list of disabled subchannels (subchannels with $\lambda_j$=TRUE) and allocates energy in a transmission frame only to those subchannels with $\lambda_j$=FALSE.

While the foregoing description of FIGS. 5-7 has been made with respect to the BS 10 disabling subchannels in DL transmissions, the same disable scheme may be employed in any one or more of the MSs 20(1)-20(L) in UL transmission to the BS 10 by monitoring link quality data in subchannels of transmissions received from the BS 10.

Figure 8:
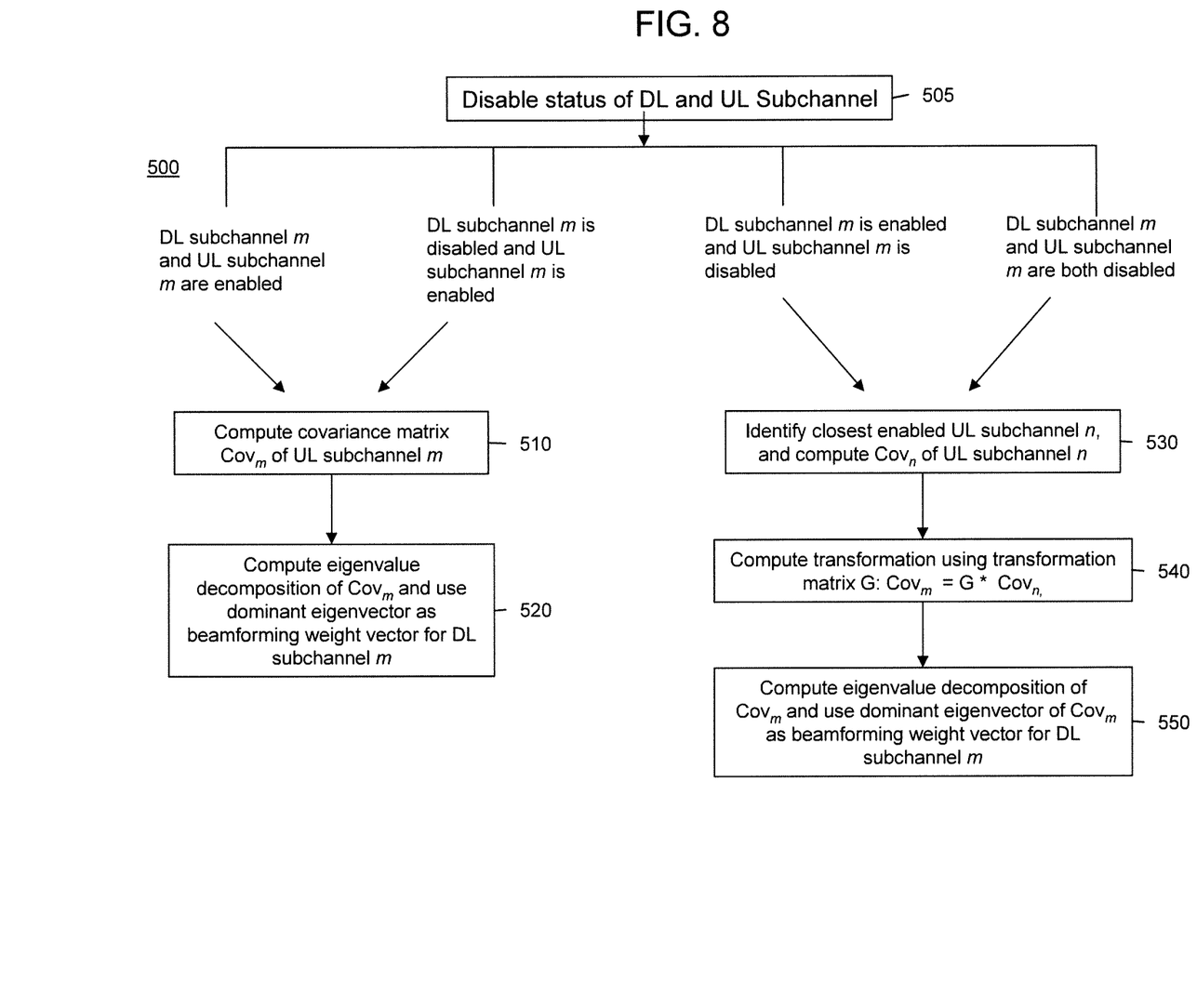
FIG. 8 is a flow chart depicting a process for computing beamforming weights for individual subchannels based on disable states of the subchannels.

Turning now to FIG. 8, a further use of the subchannel disable status information is described. In particular, FIG. 8 illustrates beamforming weight computation process logic 500 that uses disable states of subchannels for the UL and DL to determine how to compute beamforming weights used in a transmission. Beamforming weights specific to each subchannel are computed based on a disable status of the subchannel in a received UL transmission and in a DL transmissions to be sent. For example, in the case where the BS 10 comprises two or more antennas (M>=2), the process logic 500 is useful. Similarly, in the case where any MS employs the adaptive subchannel disable scheme described herein and that MS also has two or more antennas (N>=2), the process logic 500 is useful.

At 505, the disable status of DL and UL subchannels between the BS 10 and a given MS is evaluated. In general, there are four possible scenarios concerning the disable status of a subchannel in a DL and UL. The first is when the subchannel m is enabled in both the DL and UL. The second is when the subchannel m is disabled in the DL and enabled in the UL. The third is when the subchannel is enabled in the DL and disabled in the UL. The fourth is when the subchannel is disabled in both the UL and DL.

The computation technique for the beamforming weights is the same for the first two scenarios. At 510, the BS 10 computes a covariance matrix $COV_m$ for subchannel m from an UL transmission received from a given MS at the M antennas of the BS 10. Then at 520, an eigenvalue decomposition of the covariance matrix $COV_m$ is computed and the dominant eigenvector of $COV_m$ is used as the beamforming weight vector (comprising the antenna specific beamforming weights) for subchannel m for a DL transmission from the BS 10 to that MS.

The computation technique for the beamforming weights is also the same for the third and fourth scenarios described above. In particular, at 510, the closest (in frequency distance) enabled subchannel to subchannel m in the UL is identified. This closest subchannel is referred to a subchannel n. A first covariance matrix $COV_n$ is computed for subchannel n from the UL transmission received from a given MS at the M antennas of the BS 10. At 540, a transformation is computed using a transformation matrix G, such that a second covariance matrix is computed for subchannel m, $COV_m=G*COV_n$. G is a matrix that depends on the frequency distance between subchannels m and n. Next, at 550, the eigenvalue decomposition is computed for the covariance matrix $COV_m$ and the dominant eigenvector of $COV_m$ is used as the beamforming weight vector (comprising the antenna specific beamforming weights) for subchannel m for a DL transmission from the BS 10 to that MS.

The adaptive subchannel disable scheme described herein has numerous benefits. First, it does not require any pre-selection of channel disable scheme parameters. Instead, the scheme learns from the wireless channel conditions and dynamically adapts accordingly. Second, all of the subchannels share a common framework of disable control parameters. In addition, the dynamically changing subchannel status information can be employed to alter the beamforming weights used when one device beamforms its transmissions to the other device.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
    receiving at a first wireless communication device transmissions sent by a second wireless communication device, wherein the transmissions occupy some or all of a plurality of subchannels within a frequency band that are available for use in the transmission;
    evaluating the transmissions received at the first wireless communication device in each subchannel for an over-the-air wireless link between the first wireless communication device and the second wireless communication device to identify one or more of the plurality of subchannels having a link quality that is unusable in transmissions such that the one or more of the plurality of subchannels should be disabled;
    determining time durations that each of the one or more of the plurality of subchannels should be disabled; and
    independently disabling use of the one or more of the plurality of subchannels in transmissions that are sent by the first wireless communication device to the second wireless communication device during the determined time durations.

2. The method of claim 1, wherein evaluating comprises generating subchannel link quality data for each occupied subchannel, wherein the subchannel link quality data indicates a quality of received energy in an occupied subchannel associated with a received transmission, and updating subchannel link history data for corresponding ones of the plurality of subchannels based on the subchannel link quality data generated for a received transmission.

3. The method of claim 2, wherein evaluating further comprises updating global channel statistic information from the subchannel link history data for the plurality of subchannels, wherein the global channel statistic information indicates how the wireless link between the first wireless communication device and the second wireless communication device is changing over time.

4. The method of claim 3, wherein evaluating further comprises comparing the global channel statistic information with a threshold and setting a disable scheme flag to a first state during which one or more subchannels in transmissions from the first wireless communication device to the second wireless communication device are disabled when the global channel statistic information is less than the threshold indicative of the wireless link between the first and second wireless communication devices changing in a relatively slow manner and setting the disable scheme flag to a second state during which one or more subchannels in transmissions from the first wireless communication device to the second wireless communication device are not disabled because the wireless link is changing too quickly.

5. The method of claim 4, wherein when the disable scheme flag is set to the first state, evaluating further comprises comparing at least one of the subchannel link history data and the subchannel link quality data for each subchannel with a disable threshold and when at least one of the subchannel link history data and the subchannel link quality data for each subchannel satisfies the disable threshold, setting a subchannel disable flag to a first state during which the corresponding subchannel is disabled and otherwise setting the subchannel disable flag to a second state during which the subchannel is not disabled.

6. The method of claim 5, wherein independently disabling comprises allocating in a transmission sent from the first wireless communication device to the second wireless communication device subchannels whose subchannel disable flag is set to the second state and not allocating subchannels whose subchannel flag is set to the first state.

7. The method of claim 5, and further comprising starting a disable timer for each subchannel whose subchannel disable flag is set to the first state and incrementing the disable timer by one transmission duration for a subchannel whose disable flag is set to the first state for a transmission.

8. The method of claim 7, and further comprising comparing the subchannel disable timer with a disable time duration and when it is determined that that disable timer for a subchannel exceeds the disable time duration, setting the subchannel disable flag to the second state to thereby terminate any further disabling of the subchannel.

9. The method of claim 8, and further comprising updating the disable time duration by increasing the disable time duration by an amount when the global channel statistic information indicates that the wireless link is changing relatively slowly and decreasing the disable time duration by an amount when the global channel statistic information indicates that the wireless link is changing relatively fast.

10. The method of claim 1, and wherein receiving, evaluating and independently disabling are performed by the first wireless communication device with respect to each of a plurality of second wireless communication devices that communicate with the first wireless communication device.

11. The method of claim 1, wherein the first wireless communication device comprises a plurality of antennas, and further comprising computing beamforming weights for each subchannel that are applied to the transmission to produce corresponding individual weighted transmitted signals for transmission via corresponding ones of the plurality of antennas of the first wireless communication device to at least one antenna of the second wireless communication device, and wherein computing the beamforming weights for each subchannel is based on a disable status of the subchannel in a received transmission and in a transmission to be sent to the second wireless communication device.

12. The method of claim 11, wherein when a subchannel is enabled in both a received transmission and in a transmission to be sent and when a subchannel is enabled in a received transmission but is disabled in a transmission to be sent, computing the beamforming weights comprises computing a covariance matrix for the subchannel based on the received transmission at the plurality of antennas and computing the beamforming weights from the covariance matrix.

13. The method of claim 11, wherein when a subchannel is disabled in both a received transmission and in a transmission to be sent and when a subchannel is disabled in a received transmission and enabled in a transmission to be sent, computing the beamforming weights comprises computing a first covariance matrix based on a received transmission at the plurality of antennas in a closest in frequency distance subchannel, computing a second covariance matrix from the first covariance matrix using a transformation matrix that is based on a frequency distance between the subchannel and the closest subchannel, and computing the beamforming weights from the second covariance matrix.

14. An apparatus comprising:
at least one antenna;
a receiver that is configured to connect to the at least one antenna and to produce a receive signal associated with transmissions received from another wireless communication apparatus, wherein the transmissions occupy some or all of a plurality of subchannels within a frequency band that are available for use in the transmission;
a controller configured to connect to the receiver, wherein the controller is configured to evaluate the received transmissions in each subchannel for an over-the-air wireless link with respect to the other wireless communication apparatus to identify one or more of the plurality of subchannels having a link quality that is unusable for transmissions such that the one or more of the plurality of subchannels should be disabled, determine time durations that each of the one or more of the plurality of subchannels should be disabled, and to independently disable use of the one or more of the plurality of subchannels in transmissions that are to be sent to the other wireless communication apparatus during the determined time durations; and
a transmitter that is configured to connect to the controller and to the at least one antenna, wherein the transmitter is configured generate a transmit signal for transmission via the at least antenna based on commands received from the controller.

15. The apparatus of claim 14, wherein the controller is configured to evaluate the received transmissions by generating subchannel link quality data for each occupied subchannel that indicates a quality of received energy in an occupied subchannel associated with a received transmission, updating subchannel link history data for corresponding ones of the plurality of subchannels based on the subchannel link quality data generated for a received transmission and updating global channel statistic information from the subchannel link history data for the plurality of subchannels, wherein the global channel statistic information indicates how the wireless link is changing over time.

16. The apparatus of claim 15, wherein the controller is further configured to compare the global channel statistic information with a threshold and set a disable scheme flag to a first state during which one or more subchannels in transmissions to the other wireless communication apparatus are disabled when the global channel statistic information is less than the threshold indicative of the wireless link changing in a relatively slow manner and setting the disable scheme flag to a second state during which one or more subchannels in transmissions to the other wireless communication apparatus are not disabled because the wireless link is changing too quickly.

17. The apparatus of claim 15, wherein the controller is further configured to, when the disable scheme flag is set to the first state, compare at least one of the subchannel link history data and the subchannel link quality data for each subchannel with a disable threshold and when at least one of the subchannel link history data and the subchannel link quality data for each subchannel satisfies the disable threshold, set a subchannel disable flag to a first state during which the corresponding subchannel is disabled and otherwise setting the subchannel disable flag to a second state during which the subchannel is not disabled.

18. The apparatus of claim 17, wherein the controller is configured to independently disable one or more subchannels by allocating in a transmission to be sent to the other wireless communication apparatus subchannels whose subchannel disable flag is set to the second state and not allocating subchannels whose subchannel flag is set to the first state.

19. The apparatus of claim 14, and comprising a plurality of antennas, and wherein the controller is further configured to computing beamforming weights for each subchannel that are applied to the transmission to produce corresponding individual weighted transmitted signals for transmission via corresponding ones of the plurality of antennas, and wherein the controller is configured to compute the beamforming weights for each subchannel based on a disable status of the subchannel in a received transmission and in a transmission to be sent to the other wireless communication apparatus.

20. Logic encoded in one or more non-transitory tangible media for execution and when executed operable to:
evaluate transmissions received at a first wireless communication device that are sent by a second wireless communication device for an over-the-air wireless link between the first wireless communication device and the second wireless communication device, wherein the transmissions occupy some or all of a plurality of subchannels within a frequency band that are available for use in the transmission, wherein the evaluation identifies one or more of the plurality of subchannels having a link quality that is unusable for
transmissions such that the one or more of the plurality of subchannels should be disabled; and
determine time durations that each of the one or more of the plurality of subchannels should be disabled; and
independently disable use of the one or more of the plurality of subchannels in transmissions that are to be sent by the first wireless communication device to the second wireless communication device during the determined time durations.

21. The logic of claim 20, wherein the logic that evaluates comprises logic that is configured to generate subchannel link quality data for each occupied subchannel that indicates a quality of received energy in an occupied subchannel associated with a received transmission, update subchannel link history data for corresponding ones of the plurality of subchannels based on the subchannel link quality data generated for a received transmission and update global channel statistic information from the subchannel link history data for the plurality of subchannels, wherein the global channel statistic information indicates a degree to which the wireless link is changing over time.

22. The logic of claim 21, and further comprising logic that is configured to compare the global channel statistic information with a threshold and set a disable scheme flag to a first state during which one or more subchannels in transmissions to the second wireless communication device are disabled when the global channel statistic information is less than the threshold indicative of the wireless link changing in a relatively slow manner and setting the disable scheme flag to a second state during which one or more subchannels in transmissions to the second wireless communication device are not disabled because the wireless link is changing too quickly.

23. The logic of claim 22, and further comprising logic that is configured to, when the disable scheme flag is set to the first state, compare at least one of the subchannel link history data and the subchannel link quality data for each subchannel with a disable threshold and when at least one of the subchannel link history data and the subchannel link quality data for each subchannel satisfies the disable threshold, set a subchannel disable flag to a first state during which the corresponding subchannel is disabled and otherwise setting the subchannel disable flag to a second state during which the subchannel is not disabled.

24. The logic of claim 20, and further comprising logic that is configured to compute beamforming weights for each subchannel that are applied to the transmission to produce corresponding individual weighted transmitted signals for transmission via corresponding ones of a plurality of antennas of the first wireless communication device to at least one antenna of the second wireless communication device, and wherein the logic that computes the beamforming weights comprises logic that computes beamforming weights for each subchannel based on a disable status of the subchannel in a received transmission and in a transmission to be sent to the second wireless communication device.

* * * * *